Figure 1:
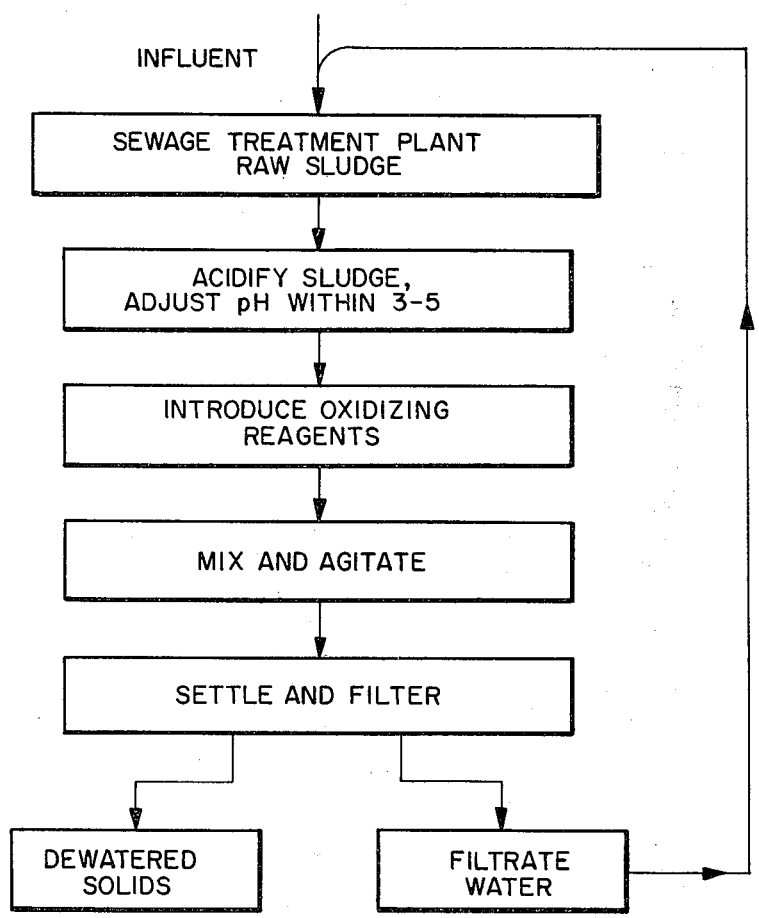

United States Patent [19]

Barrick et al.

[11] 4,377,486
[45] Mar. 22, 1983

[54] ORGANIC SLUDGE DEWATERING PROCESS

[75] Inventors: Paul E. Barrick; George L. Zarur, both of Springfield, Va.

[73] Assignee: WRC Processing Company, McLean, Va.

[21] Appl. No.: 220,216

[22] Filed: Dec. 24, 1980

[51] Int. Cl.$^3$ .............................. C02F 1/52; C02F 1/76
[52] U.S. Cl. ...................................... 210/712; 210/724; 210/726; 210/756; 210/758; 210/916; 210/609
[58] Field of Search ............... 210/609, 702, 712, 724, 210/726, 754, 755, 756, 758, 759, 916

[56] References Cited

U.S. PATENT DOCUMENTS

| | | | |
|---|---|---|---|
| 3,530,067 | 9/1970 | Friedman | 210/612 |
| 3,772,188 | 11/1973 | Edwards | 210/609 |
| 3,772,191 | 11/1973 | Thorn | 210/724 |
| 3,816,306 | 6/1974 | Roy | 210/724 |
| 3,954,605 | 5/1976 | Davies | 210/758 |
| 3,966,450 | 6/1976 | O'Neill | 210/759 |
| 3,998,714 | 12/1976 | Armstrong | 210/758 |
| 4,124,459 | 11/1978 | Blanch et al. | 210/609 |
| 4,159,944 | 7/1979 | Erickson | 210/609 |
| 4,180,459 | 12/1979 | Zievers | 210/724 |
| 4,221,661 | 9/1980 | Shimizu | 210/759 |

FOREIGN PATENT DOCUMENTS

| | | | |
|---|---|---|---|
| 2648788 | 5/1977 | Fed. Rep. of Germany . | |
| 2327965 | 6/1977 | France | 210/609 |
| 51-32057 | 3/1976 | Japan | 210/759 |
| 54-112557 | 9/1979 | Japan | 210/759 |
| 54-119758 | 9/1979 | Japan | 210/759 |
| 54-149258 | 11/1979 | Japan . | |

OTHER PUBLICATIONS

Article, Journal of Environmental Engineering Division, (Dec. 1977, pp. 1013–1021) by Sukenik, King and Olver, entitled "Chlorine and Acid Conditioning of Sludge".

*Primary Examiner*—Ernest G. Therkorn
*Attorney, Agent, or Firm*—Dowell & Dowell

[57] ABSTRACT

A process for achieving the partial dewatering of an organic sludge by isolating a batch of the sludge, acid adjusting its pH into a range from 3 to 5, and adding an oxidizing reagent in the presence of the acid in sufficient quantity so that within one-half hour the cellular structure of the sludge has been partially broken down and enough occluded water released therefrom to increase the pH by at least one, while at the same time changing the color of the sludge to a light tan and deodorizing it and killing the pathogens therein, the sludge and other solids settling down below the supernatant liquid with a clear line of demarcation therebetween.

19 Claims, 11 Drawing Figures

TIME SCALE - 5 MIN/DIVISION

| pH | Al+ | Cd+ | Ca+ | Cr+ | Fe+ | Pb+ | Mg+ | Mn+ | Zn+ |
|---|---|---|---|---|---|---|---|---|---|
| 3 | 9.2 | <.001 | 221 | .3 | 903 | <.5 | 669 | 22.8 | 5.9 |
| 2.1* | 33.8 | .25 | 555 | .3 | 112 | <.5 | 131 | 45.9 | 27.5 |
| 2.5* | 42 | .22 | 568 | .25 | 15 | <.5 | 110 | 17.8 | 23.4 |
| 5* | 5 | .14 | 814 | 1.3 | 1.4 | <.5 | 96.5 | 2.2 | 5.6 |

\* AFTER HYPOCHLORITE TREATMENT
\+ CONCENTRATIONS ARE GIVEN AS PARTS PER MILLION

| pH | Al+ | Cd+ | Cr+ | Cu+ | Fe+ | Mg+ | Mn+ | Ni+ | Zn+ |
|---|---|---|---|---|---|---|---|---|---|
| 4 | 1.5 | <.001 | .1 | .2 | 666 | 103 | 21 | .3 | 2.6 |
| 3.5* | 3.2 | .19 | <.05 | 5.3 | 80.5 | 115 | 29.8 | .4 | 18.3 |
| 3.7* | 1.9 | .2 | <.05 | 2.9 | 2.8 | 101 | 1.2 | .3 | 14.3 |
| 5.2* | .2 | .08 | <.1 | .5 | .75 | 73 | .19 | .15 | 1.8 |

\* AFTER HYPOCHLORITE ADDITION
+ CONCENTRATIONS REPORTED AS PARTS PER MILLION

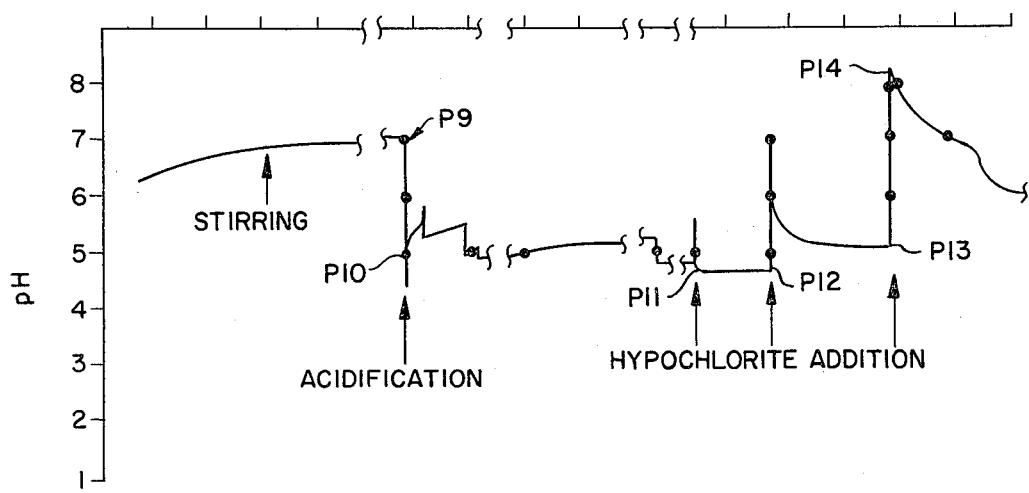
FIG. 7. (EXAMPLE 3)
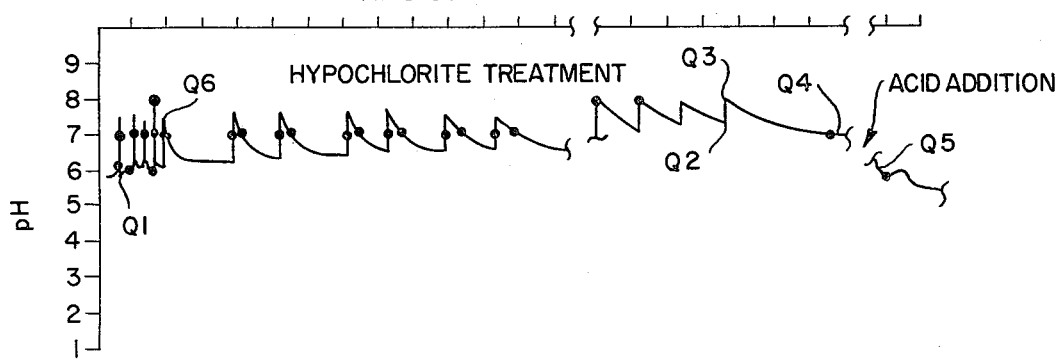
FIG. 8 (EXAMPLE 4)
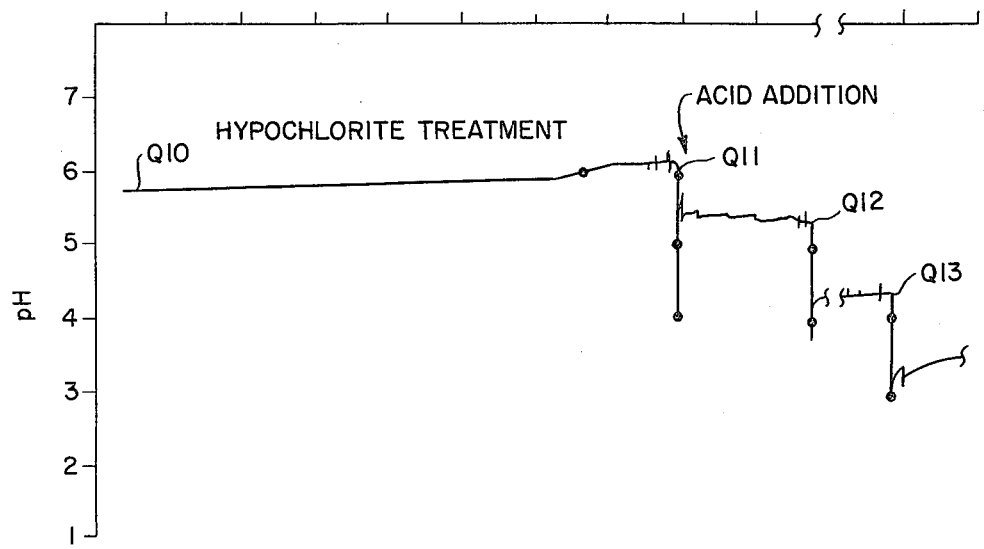
FIG. 9. (EXAMPLE 5)

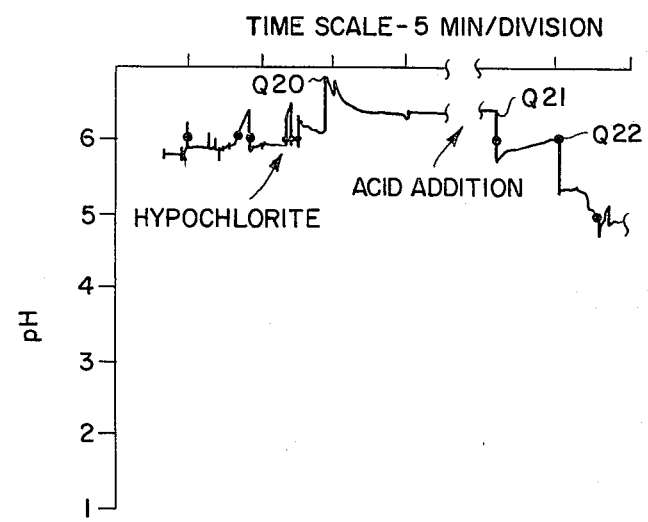
FIG. 10. (EXAMPLE 6)
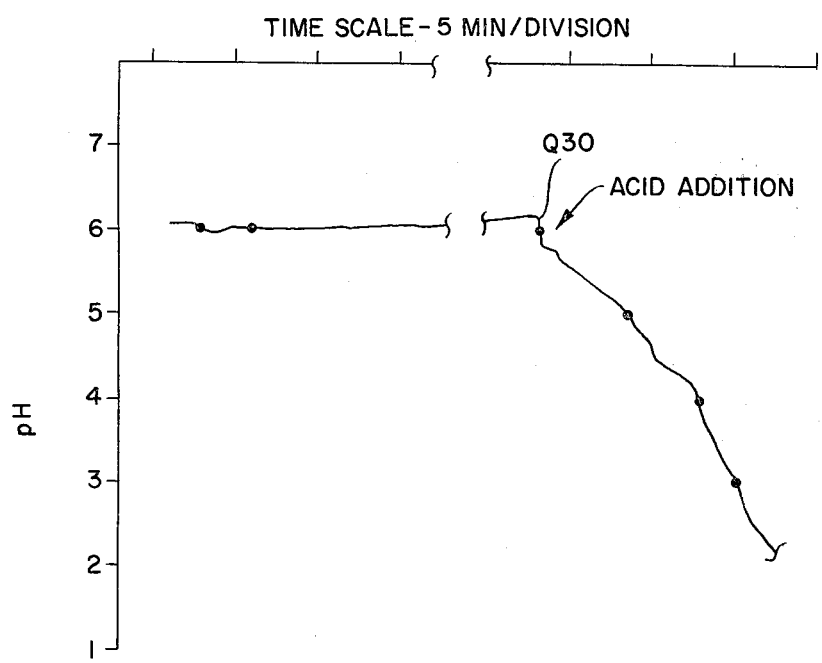
FIG. 11. (EXAMPLE 7)

ORGANIC SLUDGE DEWATERING PROCESS

BACKGROUND AND PRIOR ART

The disposal of organic sludge presents a serious problem, especially for municipalities having large quantities of sewage sludge to be disposed of. Disposal efforts are costly, involving well-known expedients such as burning the sludge in an incinerator, or hauling the sludge to a distant location for dumping or burial. The high water content of organic sludges is a major difficulty, since wet sludges cannot be burned without costly expenditure of high grade fuels to sustain combustion. Moreover, transporting of the sludge is made much more expensive by the necessity of transporting the large quantity of occluded water.

Analysis of typical raw sewage sludge reveals a water content of 80 to 90% by weight. The remaining solids generally comprise 50 to 70% organic matter typically having the following elemental breakdown: 60% carbon; 8.5% hydrogen, 27.5% oxygen and 4% nitrogen, plus inorganic solid matter including calcium, silicon, and metal values. When the raw sludge has been dewatered to a level of 60 to 70% moisture where it can be burned, it is found to have a colorific value as high as 10,000 BTU per pound, although when burned the useful yield is more likely to be in the range of 5000 to 7000 BTU per pound. This difference is accounted for by the energy required for evaporating the remaining water content. After the sludge has been dewatered to a level of 60 to 70% moisture, the organic content of the partially dewatered sludge can provide sufficient fuel value to sustain autogenous incineration at a temperature of about 1400° F., which is sufficient to dispose of the organic matter, destroy odors and pathogens, and accomplish these purposes without the necessity of adding fuel for firing the incinerator. Thus apparently autogenous combustion of sewage sludge is a highly desirable method of disposal which can also become a source of cheap energy.

The dewatering of sludge has been attempted in many different ways, aside from costly direct combustion or heat treatment of the sludge. One very desirable way of dewatering sludge is to do so under natural conditions, for instance by spreading the sludge on the ground and allowing bacterial digestion to continue while using sunlight or ambient heat for evaporating the moisture as the cellular structure slowly breaks down. However, the time-span involved is usually quite unacceptable, since it may require from two to six months depending on climatic conditions. Natural dewatering is highly dependent upon geographic location and cannot be used efficiently in most places. There have been a number of proposals for hastening a natural digestive process by the use of chemicals, for example as disclosed in U.S. Pat. No. 3,772,188 to Edwards, wherein sewage is treated with doses of oxygen to promote rapid growth of aerobic bacteria to accelerate digestion of the sludge. Another prior art approach is to attempt to mechanically dewater the sludge by rupturing the cellular structure by exerting a rapid pressure drop following application of pressure to physically rupture the cells. Such a process is disclosed in U.S. Pat. No. 4,159,944 to Erickson et al, but it is a highly energy intensive step used prior to incineration. U.S. Pat. No. 4,124,459 to Blanch et al teaches the idea of treating electrolysis brine sludge, not a bacterial organic sludge, with an acid to lower its pH below 2.5, and then leaching it with hypochlorite solvent to recover its mercury content.

In an article from the Journal of the Environmental Engineering Division, December 1977 by Sukenik, King and Olvér, pages 1013–1021, entitled "Chlorine and Acid Conditioning of Sludge", the authors describe treating an organic sludge with acid and hypochlorite to increase its filterability. The hypochlorite was introduced in very small quantities, approximately 1 gram per liter of organic sludge, which is about one-tenth the amount used to the present disclosure, and the author acknowledges that the acid rather than the chlorine was mainly responsible for the observed results. This article also discusses the fact that heavy metals were released to the supernatant liquid in such quantity as might seriously impact upon a biological waste treatment system, indicating that not enough hypochlorite was added to raise the pH back up again by release of occluded water prior to separation of the supernatant liquid from the solids so as to precipitate the metal values. The article also recognizes the change in color of the sludge to light tan along with the dewatering and consequent improvement in filterability. The authors further stated that the addition of chlorine treatment sharply decreased filterability of the sludge samples as compared to the application of acid alone. These results do not match the results of the present disclosure probably for the reason that an insufficient oxidation of the sludge resulted in failure to actually break down the organic cells and release the higher pH water from them.

German Pat. No. 2,648,788, dated May 26, 1977 discusses the dewatering of sludge by lowering the pH value to approximately 2.2, and then heating the acidulated sludge to about 65° to 95° C. to break down the organic matter at the expense of a large energy expenditure and excessive release of metal values into the supernatant liquid. Moreover, there is an undesirable dissolving of organic materials in the supernatant liquid as a result of this process.

Finally, there is a Japanese pending patent application which was published as (KOKAI KOHO) #149258/1979 on Nov. 22, 1979, based on pending Japanese application #59198/1978. This publication seeks reduction of the very large quantity of flocculants normally used in the absence of the publication's improvement, i.e. about 3–10% ferrous chloride and about 30% lime which raises the pH of the sludge to about 12.2. The Japanese publication proposes to alter the quantity of flocculants to about 10 to 20% ferrous sulfate and about 10 to 15% lime (by weight of solids) by adding sufficient acid to lower the pH to about 5, and adding hydrogen peroxide in the quantity of about 7 to 9% (by weight). This publication uses about twice as much acid as the present disclosure, perhaps because of the large quantity of lime. Apparently such use of the acid is intended to attack the organic materials, rather than to act merely as catalyst to improve the performance of the oxidizing reagent. The quantity of oxidizing reagent, hydrogen peroxide, used in the publication is also about twice the quantity used in the present disclosure when measured on a molar basis. Selecting the average value by weight of hydrogen peroxide at 8%, the Japanese figure amounts to about 0.235 moles per 100 grams of solids, whereas the present disclosure uses only about 0.116 moles per 100 grams. The Japanese process uses so much additive that the final cake of solids is 50 or 60% foreign material which is not combustible, and therefore the calorific value of the cake is greatly reduced. Moreover, the resulting Japanese ash after incineration is much less satisfactory since the metal values have been diluted so as to reduce the value of the resulting incinerated ash in a metal value recovery process of the type disclosed in U.S. Pat. No. 4,033,763 to Markels.

THE INVENTION

This invention seeks by the addition of acidifying and oxidizing reagents to an organic sludge to partially dewater the sludge, while at the same time, insofar as possible, avoiding destruction of the organic matter and retaining metal values in the sludge or in solid residue remaining therewith. The process seeks to partially depolymerize the cellulosic matrix of the sludge by exposing it to an oxidizing agent, while partially hydrolyzing the bacteria cells and rupturing and destroying their microbiological activity. The accomplishment of these purposes by an oxidizing reagent accelerates when the pH of the sludge is lowered. However to prevent dissolving of the metal values and loss thereof in the supernatant liquid, the pH must be carefully controlled so that it does not go lower than about 3. To the extent that the cellulosic structure of the sludge breaks down and the bacteria cells are ruptured, water is released from the sludge, and this water is then separated from the sludge by settling and filtering and is drawn off for disposal, for instance by being reintroduced into the influent of the sewage treatment plant. In this way the remaining chemicals in the filtrate, being in dilute proportion with respect to the raw sewage influent, will be neutralized and will have no noticeable effect on the biological processes of the sewage treatment plant itself. Moreover, since the filtrate once mixed again with the raw sewage will have its pH raised, heavy metal values which have become dissolved in the filtrate will tend to be precipitated out as its pH value is raised. The filtrate can thus be disposed of along with the clarified water from the sewage treatment plant. There are several different ways of determining when enough chemicals have been added. One way is to add enough of the acid reagent to adjust the pH into the range of 3 to 5 in the absence of the oxidizing reagent, and to add enough oxidizing reagent so that said adjusted pH level will over a period not exceeding a half an hour be raised again by at least one pH unit. The other way to determine the quantity of chemical reagents to be added, after adjusting the pH into the range of 3 to 5 is to add enough oxidizing reagent such that the mixture will within one-half hour cause separation of the batch into a clear supernatant liquid which includes about 70 to 90% of the occluded water, this supernatant appearing above the remaining organic and solid matter with a clear line of demarcation therebetween. This provides a simple test which can be performed visually, and other visual tests are also set forth for determining proper and complete treatment of the sludge, the tests including elimination of dark areas of the sludge so that the batch is turned to a light tan color, and deodorizing of the sludge and the killing of pathogens therein.

OBJECTS AND ADVANTAGES

It is a principle object of the invention to dewater organic sludge sufficiently that after a short settling period not exceeding one-half hour, and generally about ten to fifteen minutes, the sludge and other solids will have settled out below a clear supernatant liquid comprising about 70–90% of the total water occluded in the original sludge batch, with a clear line of demarcation between the solids and the supernatant. This separation can be followed by filtering and then by incineration of the solids, although the present dewatering process need not be followed by incineration since it can be considered a full treatment in itself, or can be followed by some other type of treatment process.

It is another major object of the invention to provide a chemical treatment capable of efficiently depolymerizing the cellulosic structure of the sludge by rupturing the bacterial cells and destroying the microbiological activity in the sludge, at the same time deodorizing the sludge and destroying and sterilizing organic contaminants, as indicated by change in color of the sludge to light tan.

Still another major object of the invention is to chemically treat the sludge in a manner to dewater it sufficiently that it is capable of autogenous combustion, while at the same time avoiding to as great an extent as possible the creation of soluble metal values which would dissolve in the supernatant water and result in the removal of heavy metal values from the sludge itself. Such dissolving of heavy metal values is undesirable since their presence may make the supernatant water too toxic to be returned to the aquifier without ecological damage. It is a corollary of this object to provide a system in which the supernatant which is separated from the sludge by the present dewatering process is returned, together with any metal values dissolved therein, to the influent of the sewage treatment plant so that it is mixed again with raw sewage and has its pH raised from the lower level reached in the dewatering process to a much higher level wherein dissolved heavy metal values tend to precipitate out.

It is a further major object of the invention to provide a process which achieves the desired degree of dewatering in as short a time as possible. Because of its organic content, raw sludge has a tremendous reductive capacity, and therefore it reacts very rapidly with an oxidizing agent. The lower the pH, the more rapid the reaction, and it is therefore desirable to reduce the pH as far as possible without providing a solution in which heavy metal values will easily dissolve. A pH level in the vicinity of approximately 3 seems to be about as acidic a solution as is practical from the point of view of keeping metal values undissolved to a satisfactory degree, and tests have shown that the dewatering is almost as great at pH 4.

Still another important object of the invention is to achieve the desired dewatering of the sludge while utilizing chemicals as economically as possible, a mixture of several oxidizing reagents being fully acceptable for this purpose. There are a number of powerful oxidizing agents which may be by-products from some other chemical process which are usable in the present process as will be discussed more fully below.

Another object of the invention is to provide a process for lowering the moisture content of the sludge prior to incineration so that the likelihood of particulate emission from the incinerator stack due to entrainment in escaping steam is reduced, thereby increasing the efficiency of the incinerator stack scrubber.

A further object of the invention is to dewater the sludge sufficiently that it can support combustion autogenously, while at the same time destroying as little of the organic matter as possible.

Although the present dewatering process is discussed mainly in connection with preparing a raw sludge for more efficient incineration, it is to be understood that sludge can also be prepared by the present process for subsequent chemical processes seeking removal of selected components by conversion to acid soluble forms, the preliminary dewatering step being useful, for example, in conserving acids required to further attack and degrade the organic matter remaining after dewatering.

Other objects and advantages of the invention will become apparent during the following discussion of the drawing, wherein.

THE DRAWING

Figure 2:
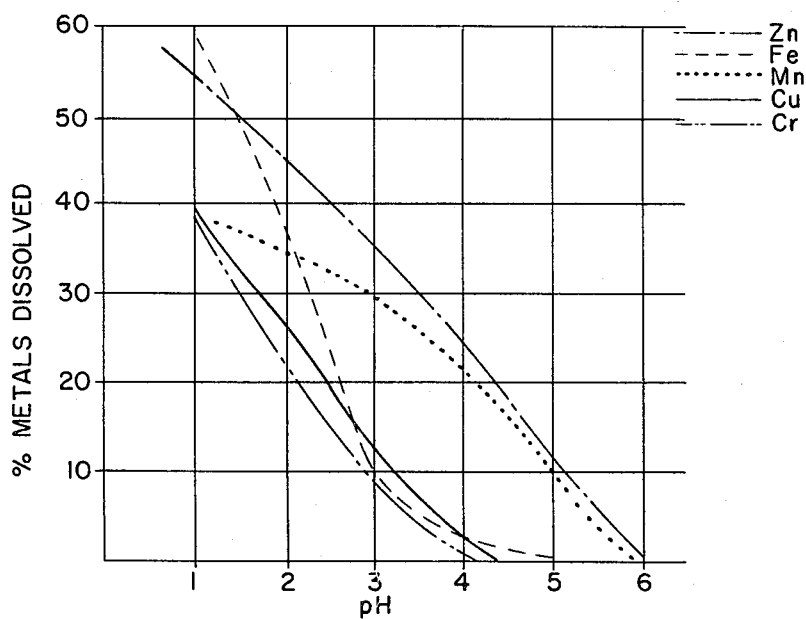

FIG. 1 is a flow diagram showing the process according to the present invention; and FIG. 2 is a graphical illustration showing the effect of reduction of the pH level of the sludge upon the solubility of certain common metal values.

Figures 3, 4:
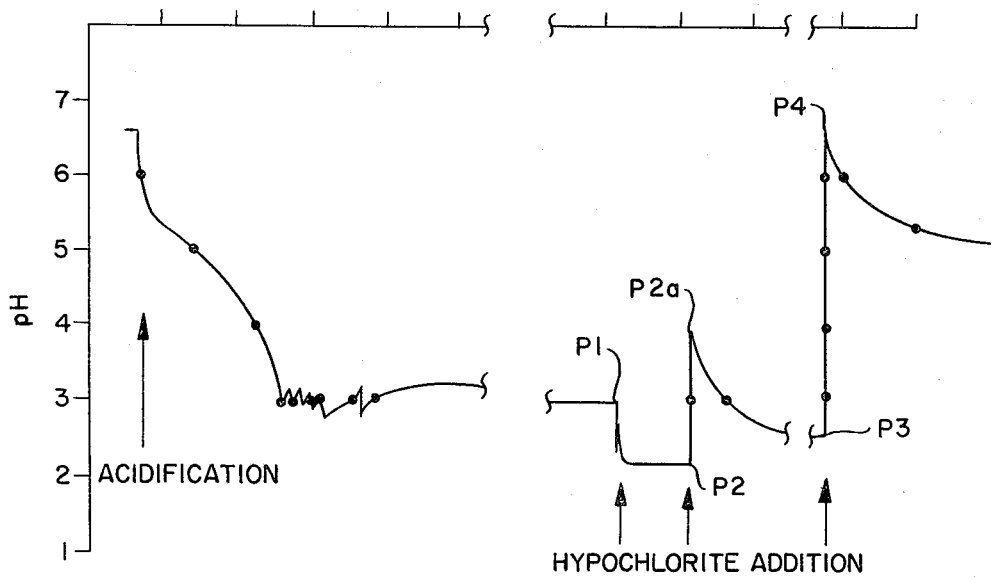
Figures 5, 6:
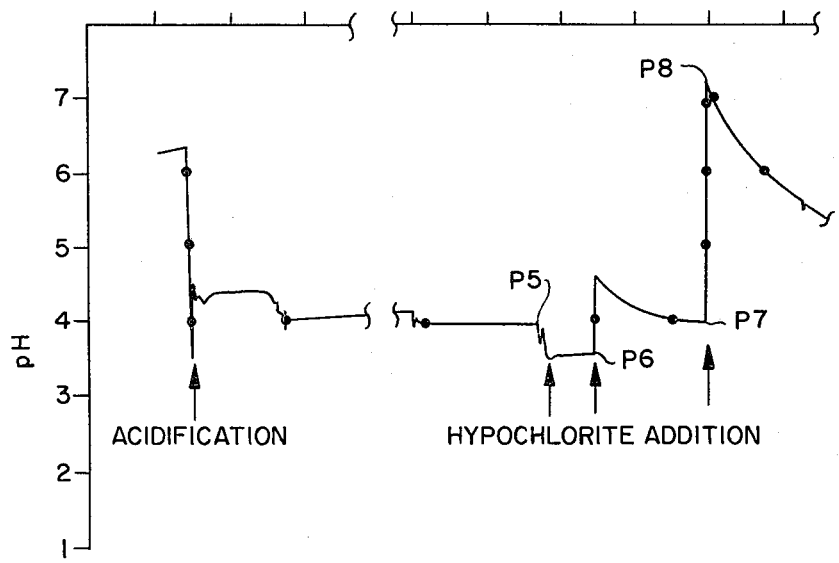

FIGS. 3 and 4 are graphical and tabular illustrations referred to in Example #1, and FIGS. 5 and 6 are similar illustrations referred to in Example #2; and FIGS. 7, 8, 9, 10 and 11 are graphical illustrations referred to respectively in Examples 3, 4, 5, 6 and 7.

DESCRIPTION OF PREFERRED PROCESS

In FIG. 1 of the drawings, the top block represents an existing sewage treatment plant in which bacterial digestion of the sludge takes place, whereby metal values are captured and imbibed by the bacteria and complexed with the organic matter in the manner referred to in Markels U.S. Pat. No. 4,033,763. In this manner the bacteria in the sludge removes the metal values from the water and captures them in the organic mass of the sludge. It is assumed that the main sewage treatment plant after a period of bacterial growth will separate the sludge from the clarified water, typically by skimming or by some other suitable process, thereby achieving separation of the sludge and delivery of it to the second block in the diagram of FIG. 1. This sludge is typically about 90% water by weight, plus organic matter, plus various metal values and a substantial proportion by weight of calcium and silicon components.

The first step according to the present process is to lower the pH of the separated sludge from its natural level which is in the vicinity of neutral, or slightly positive, the pH varying between about 6 and 8 in most instances. It is necessary to add sufficient acid to lower the pH level substantially below neutral for the purpose of accelerating the oxidizing effect of an oxidizing reagent which is added. However, for ecological reasons it is highly desirable to leave as many of the metal values, and as high a proportion of each, as possible in the sludge, rather than have these metal values dissolve into the filtrate water. One of the broad purposes of sewage treatment is to recover clarified water in a form which is pure enough so that it can be safely discharged as surface water without further treatment. Ideally, the best result would be to achieve clarified discharge water having substantially no metals therein, but this is of course not practical. Therefore, an effort is made to minimize the percentage of dissolved metal values in the dewatering process filtrate or in the clarified water discharged from the main sewage treatment plant. Thus, the present process involves a compromise between on the one hand lowering the pH of the sludge being treated with oxidants sufficiently so that it will react quickly with the oxidizing reagents, while on the other hand not lowering the pH to such a level that the metal values and organic complexes dissolve in the separated filtrate water to a substantial degree.

FIG. 2 shows curves for a few of the more prevalent metals found in the sludge which is the subject of examples set forth below in this specification, the curves showing the percent of metal values dissolved in the filtrate water at the end of the present dewatering process plotted against the final pH of the filtrate water. It will be noted that for a pH level above about 6 very little of the metal values will remain dissolved in the filtrate, whereas as the pH level is reduced below 4, the metal values begin dissolving in ever increasing percentages, until in the vicinity of pH 1 high percentages of these metal values are in fact dissolved in the very water which the process seeks to recover substantially free of contaminating metal values. Many common metal values are quite toxic and would prevent disposal of the filtrate water in the aquifer. Therefore, the present process proceeds with a pH value in the vicinity of 4 which provides a desirable catalytic effect to aid the oxidizing reagent, but terminates with a pH of at least 6 thereby leaving the metal values substantially undissolved so that they precipitate out and remain with the organic sludge mass.

There are a number of different acids which can be used to lower the pH level to the vicinity of 4, but sulfuric acid is generally considered the most satisfactory, from both the point of view of cost, and also because of the fact that a high proportion of the commonly encountered metal sulfates which form with sulfuric acid tend to have low solubility in the filtrate water in the vicinity of pH 6. Moreover, the sulfate ion combines with calcium in the sludge which forms a gypsum which is highly insoluble and precipitates out of the filtrate, thereby decreasing the dissolved mineral content in the filtrate water. On the other hand, if hydrochloric acid is used, calcium chloride is formed which is quite soluble and remains as a contaminant in the filtrate water together with a number of metal chlorides which also dissolve in the water.

The pH should be carefully monitored and additional acid added, because as the organic cells are broken down they release water at a much higher pH, i.e. in the vicinity of neutral. Thus, as the sludge is hydrolized by the oxidizing agent the pH will tend to rise, and may have to be lowered again as the dewatering progresses. Conversely, if the pH value should accidentally be lowered to too low a value so that metal values and organic matter were beginning to dissolve excessively, soda ash can be added to adjust the pH upwardly, whereby to achieve precipitation of metal values as hydroxides and carbonates. The dissolved organic matter would not thereby be precipitated, however.

Referring again to FIG. 1, the step shown in the third block introduces an oxidizing reagent which attacks the cellulosic structures of the sludge and the bacterial cells and breaks them down for the purpose of releasing some of the water entrapped in the cells. Hypochlorites in the form of sodium salts can be used, but calcium hypochlorites are deemed superior because they will react with the sulfate ions to form additional gypsum, thereby adding to the solid matter in the sludge and improving the filtration capabilities thereof. Moreover, if precious metals are present, calcium hypochlorite will tend to precipitate out compounds containing these precious metal values, thereby removing them from the filtrate water. In general, any one of the oxochlorine negative ions such as $ClO^-$, $ClO_2^-$, $ClO_3^-$ is desirable.

Another reagent which can be used to advantage would be a chromic acid solution with $H_2SO_4$ as is formed through the reaction of sodium chromate and sulfuric acid. The forming of such a chromic acid solution for this purpose would be prohibitively expensive, but waste chromic acid solutions are highly useful for this purpose even though they may contain other contaminants such as iron. The chromic acid solution is a strong oxidizing reagent, and may also provide sufficient acid ions to lower the pH of the sludge to the vicinity of pH 4. However, if the chromic acid solution does not lower the pH to the proper level, it can be lowered by adding additional sulfuric acid.

Another oxidizing reagent which can be used is $KNO_3$ or $NaNO_3$ added with NaCl. When added to the sludge along with sulfuric acid sufficient to properly lower the pH level, the solution forms $HNO_3$ which is a powerful oxidizing agent plus HCl. However, because the sulfate ions are present together with the chloride ions, there is a great tendency for the sulfate ions preferentially to combine to form precipitates than the tendency of chloride ions to combine with the metal values to form soluble metal chlorides.

Still another oxidizing reagent which can be added to the sludge, after the pH has been adjusted downwardly by the addition of sulfuric acid, is a mixture of hydrogen peroxide and chorine gas to form a strong oxidizing solution.

Other economic choices include a waste acid solution of permanganate, if available as a product from other processes since formation thereof from pure stock would be prohibitively expensive. Ozone and dichromate are also possible choices.

After the oxidizing reagent is inserted, as shown in the third block in FIG. 1, the sludge should be stirred and agitated as shown in the fourth block. Since the sludge is predominantly organic matter, and therefore has tremendous reductive capacity, it reacts with great speed with the oxidizing reagent in a mildly acidic solution. As the oxidizing reagent is stirred into the raw sludge, hydrolizing of the organic matter occurs very quickly, and this fact makes it possible to visually observe when a sufficient quantity of oxidizing reagent has been added. The gelatinous mass becomes much more mobile and easy to stir and begins becoming lighter in color with decreasing black areas and decreasing odor. Once the breakdown of organic material has ceased, and the pH has elevated and stabilized, it is highly desirable to filter the mass so as to separate the filtrate therefrom and thereby greatly reduce the quantity of bulk water present. This separation tends to immediately stop the degradation of the organic matter, since it is not desirable to allow degradation of the organic matter to proceed beyond the point required to achieve the necessary dewatering, because degradation of the organic matter reduces its value as a fuel capable of autogenous combustion. Moreover, the more the slude is degraded, the more metal values are liberated from it, thereby making them readily available to go into solution in the filtrate water whereby they would be returned to the sewage treatment plant. One of the purposes of the present invention is to retain as high a proportion of the metal values in the sludge as possible, so that when the sludge is incinerated the metal values can be recovered from the ash, and so that the least possible amount of metal values and organic matter will be dissolved in the filtrate water which is returned to the sewage treatment plant and eventually to the aquifer. The solids which are recovered as a result of precipitation and filtration including the organic matter can then be further air dried so as to raise their combustibility, or can be fed directly into an incinerator which is already up to temperature.

The filtrate water, on the other hand, is easily disposed of by returning it to the sewage treatment plant by mixing it with the influent. This not only disposes of the filtrate water, but has the great advantage of further raising its pH level by mixing it with the raw sewage, whereby metal values which were dissolved in the filtrate water will tend to be precipitated out at the sewage treatment plant as sediment, or re-imbibed by bacteria. Ordinarily the quantity of filtrate returning to the sewage treatment plant from the filter will be small as compared with the quantity of influent entering the sewage treatment plant.

As soon as the filtrate containing the oxidizing agents is separated from the precipitated solids, the degradation of the organic matter will tend to immediately stop because any further breakdown of the cellulosic structure releases additional water whose pH is in the vicinity of 6 to 8, thereby raising the pH of the mass of sludge up to a point whereat any remaining oxidizing agents will react only very slowly with the cellular structure of the sludge. Ultimately the filtrate from the filter in the present dewatering process is discharged with the clarified water leaving the sewage treatment plant.

The illustrative dewatering process is discussed herein as a process performed preliminary to the further processing of the dewatered sludge, but it is not necessarily preliminary to an incineration step. Instead, the dewatered sludge can be further oxidized by treating it with massive chemical doses, for instance with sulfuric acid to further degrade and break down the organic matter. Preliminary dewatering of the sludge according to the present process would in such a case greatly reduce the amount of additional chemicals necessary to be added during subsequent treatment of the sludge. In addition dewatering makes it easier to dispose of the sludge by mechanical handling and transportation thereof to a disposal site, as may be the case where the sludge is moved to a burial location by truck, or is carried out to sea for disposal on a barge.

EXAMPLES

The following examples illustrate the process according to the present invention.

EXAMPLE 1

This example describes an experiment on 200 mililiters of sludge taken from the Lorton, Virginia Sewage Treatment Plant after the sludge had passed through the bacterial growing stage and was ready for dewatering. The pH of the sludge was initially 6.7, and therefore 8 milliliters of 25% by volume sulfuric acid was introduced along with suitable stirring, resulting in depression of the pH to 3. When the pH had stabilized at 3, three aliquot infusions of hypochlorite solution were added, each comprising 25 milliliters of 5.25% sodium hypochlorite. FIG. 3 of the drawings shows the pH of the sludge during the treatment plotted against time. The first hypochlorite aliquot was added at the point P1, and it will be seen that the pH immediately dropped almost to 2 where it remained constant. After several minutes, the second aliquot of hypochlorite was added, and it will be noted that the addition was made at the point P2 and that the pH of the sludge immediately rose almost to 4, and then fell slowly back to stabilize at about 2.6 at P3. The third aliquot was introduced at the point P3, and this raised the pH of the solution back to about 6.7 almost immediately. From the point P4, the pH then fell slowly back over a period of about 10 minutes to end at approximately 5.1. Further inspection of the trace of FIG. 3 shows that the addition of the first hypochlorite aliquot at the point P1 unexpectedly reduced the pH, whereas the subsequent injections raised the pH rather considerably each time. The mechanism by which this first reduction occurred is not fully understood, but it is believed that there may have been some interaction between the sulfuric acid introduced into the sludge and the hypochlorite which was added at point P1. The second addition at point P2 had the expected effect of rapidly raising the pH from the level of about 2.2 prior to the point P2a to approximately 4 at the instant after infusion of the second aliquot. This is explained by the fact that the hypochlorite attacked organic matter in the sludge and released a large quantity of water having a much higher pH since the water was taken from the cells which are broken down by the second aliquot. Over a period of time, as this water mixed with the bulk water in the sample, the pH fell back down again until it levelled off at about 2.6. The introduction of the third aliquot at the point P3 again caused a large release of water from the cell of the organic matter, raising the pH to about 6.7 at the point P4, from which point the pH fell back over a period of time and levelled off at about 5.1. At this time, 75 milliliters of 5.25% sodium hypochlorite had been added to 200 milliliters of sludge, and the sludge was found to have been satisfactorily dewatered. The supernatant bulk water was drained from the sample, and it was found that the remaining organic matter, gypsum, and metal values contained about 50% moisture. The organic matter dewatered to this extent can support autogenous combustion, and therefore no further reduction of water content is necessary or desirable.

During the course of the experiment, specimens of the supernatant water were drawn off at several different times. The results of analysis to determine the parts per million concentration of various metal values can be seen in FIG. 4. The first horizontal line of metal values were taken at pH 3 subsequent to acidification of the batch, but prior to the first addition of hypochlorite. As will be seen, there was a considerable concentration of calcium and iron and magnesium, but the other metals appeared in smaller concentrations. After the first hypochlorite aliquot just beyond P1, a second sample was taken and analyzed at pH 2.1, and this sample is shown in the second horizontal line of the table of FIG. 4. It will be seen that the concentrations of most metals have greatly increased, except for iron and magnesium which decreased, and this general increase is believed to be attributable to the low pH of the solution which causes a much greater quantity of metal values to dissolve than would be the case at higher pH levels as can be seen by inspecting FIG. 2. The third sample line in FIG. 4 was taken beyond the point P2 when the pH had stabilized at 2.5, and although one would expect a slight decrease in the concentration of the metal values, some of them were increased, or at least scarcely decreased. This is probably attributable to the fact that the breaking down of the organic cells by the second hypochlorite aliquot put more metals into the bulk water, and this tended to compensate for the fact that the pH had increased somewhat. The fourth row represents a sample taken at pH 5 beyond the point P4 in FIG. 3, and it will be noted that the concentrations of most of the metals were decreased substantially, due to the increase in pH back up to 5. There are certain metal values whose solubility is unaffected by the pH, particularly lead. Moreover, the iron and magnesium have been substantially precipitated from solution by uniting with the sulfate ions. The solubility of chromium values increased somewhat.

The remaining organic matter formed a damp cake of cellulosic nature which dried under ambient conditions in about 72 hours to 10% moisture content, which compares very favorably with a much longer time which would have been required under similar circumstances to dry the untreated sludge as it came from the sewage treatment plant, prior to the present dewatering process.

EXAMPLE 2

This example employed a similar 200 milliliter sampling of sludge whose initial pH stood at approximately 6.3. To this sample was added 6.6 milliliters of 25% by volume sulfuric acid which brought the pH level down to 4 as can be seen in FIG. 5. The sample was then injected with three successive aliquots of 25 milliliters of 5.25% sodium hypochlorite, which were added at the points P5, P6 and P7 in FIG. 5. Here again, the first addition of hypochlorite lowered the pH rather unexpectedly to about 3.5. At the point P6, a second addition of a 25 milliliter aliquot of sodium hypochlorite released enough water from the organic cells to raise the pH to about 4.7, and then over a period of time the pH declined back to about 3.9 as the released cellular water became fully mixed with bulk water containing the acidification. After about 6 minutes, the third aliquot of sodium hypochlorite was introduced at point P7, and sufficient water was released from the hydrolized organic cells to raise the pH to about 7.2 at point P8, and from there the pH fell back down to the last plotted point of about 5.2.

Once again, specimens were withdrawn four times during the process and analyzed for metal content. These are shown in the table of FIG. 6. The first sample was withdrawn at pH 4 after acidification of the sludge, but prior to introducing any hypochlorite solution. Since the pH of the sludge was initially lowered only to 4, instead of 3 as was the case shown in FIGS. 3 and 4, the concentration of metals dissolved in the bulk water at pH 4 in the top line of FIG. 6 is substantially less than appears in the top line of FIG. 4 for most metal values. The first aliquot of sodium hypochlorite was then added at point P5, and the second line from the table of FIG. 6 shows the concentration of metals when the pH stabilized at 3.5. Here again, the concentrations are all lower than in the corresponding line of FIG. 4 because the pH is higher. The next sample was taken at pH 3.7 just prior to the point P7 of FIG. 5, and here again the concentrations were uniformly lower than appeared in the third line of the table of FIG. 4. The final sample was taken at pH 5.2 beyond the point P8 of FIG. 5 and produced the last horizontal line in FIG. 6 which shows concentration uniformly less than the concentrations shown in the table of FIG. 4 for the same line. However, the concentrations appearing in the last line of both FIG. 4 and FIG. 6 are so small as to point to the conclusion that very little advantage is gained by adding enough acids to go from pH 4 to pH 3. Moreover, examination of the cake of organic residue indicated very little difference. Both cakes contained about 50% moisture, but the difference between the two cakes was too slight to justify going much below pH 4 during the initial acidification step.

EXAMPLE 3

This example employed a similar 200 milliliter sampling of sludge whose initial pH stood at approximately 7.1 at the time of acidification. At point P9 enough sulfuric acid was added to bring the pH level down to 5 at point P10 as can be seen in FIG. 7. The sample was then injected with three successive injections of 5.25% sodium hypochlorite, which were added at the points P11, P12 and P13. The first injection was 25 milliliters, and the second and third injections were both 50 milliliters, making a total of 125 milliliters. The first addition of hypochlorite lowered the pH to about 4.8. At the point P12 a second addition of a 50 milliliters of sodium hypochlorite released enough water from the organic cells to stabilize the pH at about 5.1. After about 10 minutes, the third 50 milliliter injection of sodium hypochorite was introduced at point P13, and sufficient water was released from the hydrolized organic cells to greatly raise the pH which then fell back down and stabilized at about 6 after about 15 minutes.

After the first hypochlorite injection at point P11, some dewatering resulted in an increase in the mobility (stirability) of the sludge. After the second hypochlorite injection, now totaling 75 milliliters of hypochlorite, the color had changed to a light gray, but not the light tan color which is characteristic of a completed reaction. A residual odor remained, and there was a partial tendency of solids to settle out although the line of demarcation between supernatant liquid and settling solids was indistinct and the volume of liquid was much smaller than the volume of solids at the bottom. When another injection of 50 milliliters of hypochlorite was introduced and the mixture was stirred for fifteen minutes, the solids thereupon settled rapidly out with a clear separation from the supernatant liquid and the solids were then deodorized and light tan in color, indicating completion of the process.

From this example, it is concluded that acidification sufficient to lower the pH of the sludge prior to oxidation to about 5 produces borderline results which are less than economical. In example 3, not only did the dewatering proceed more slowly than in the two previous examples, but much more hypochlorite was required to achieve the desired dewatering and deodorizing, i.e. 125 milliliters instead of 75 milliliters as used in examples 1 and 2. Until the last 50 milliliters were added, the process clearly had not been completed, as observed by poor separation of solids from the liquid, gray color and residual odor.

EXAMPLE 4

Example 4, FIG. 8, represents a departure from the previous three examples in that the hypochlorite was added first in point of time, and was then followed by the addition of sulfuric acid. 200 milliliters of the same type of sludge was treated in this experiment with fifteen successive aliquots of sodium hypochlorite, each comprising a 10 milliliter addition of 5.25% solution, accompanied by stirring, making a total of 150 milliliters. It will be noted that the initial sludge started out with a pH of about 5.7, and that after the 15 aliquots were added the pH and reached approximately 7. In other words, there was a tendency for the trace to return to a somewhat higher stabilized pH after each infusion, which is attributable to the fact that the cells of the organic material were breaking down and releasing their higher pH water into the bulk water, thereby slowly raising its pH. Note that the first aliquot introduced at the point Q1 produced a markedly greater initial jump in pH level than occurred at the last infusion at point Q2 which raised the pH of the sample only slightly to the level shown at Q3, probably indicating that the cells were pretty well broken down in the sludge by the time the fifteenth aliquot of sodium hypochlorite had been introduced. However, an inordinately long treatment time was necessary to break down the sludge in the absence of acidification. After sitting awhile, the pH stabilized to around 7 at the point Q4, and at the point Q5 the acid treatment began, the acid being introduced in small increments of 10% by volume sulfuric acid until a total quantity of 40 milliliters was added. This acid was added at five different points, reducing the pH respectively to 5,4,3,2 and 1, and the solution was sampled at the various pH levels to determine the degree of heavy metal values dissolving. The results were roughly similar to what is shown in the tables of FIG. 4 and 6 for the various pH levels, and it was found that the resulting sludge cake had again about 50% moisture, the cake drying to 10% moisture in about 72 hours. However, it appears that the hypochlorite treatment, at such a high level of about 150 milliliters, had done most of the work of breaking down the organic cells, and that as a consequence the subsequent acid treatment accomplished very little, except to increase the undersirable dissolving of metal values in the bulk water. From this experiment it is concluded that 150 milliliters of hypochlorite added to the sludge was on a practical basis no better than the much smaller amounts added in examples 1, 2 and 3 and probably resulted in the undesirable dissolving of an excessive quantity of organic material in the supernatant liquid.

EXAMPLE 5

The experiment conducted in example 5, FIG. 9, is similar to example 4 in that the hypochlorite treatment came first, and was then subsequently followed by the sulfuric acid treatment. In this experiment, however, 200 milliliters of similar sludge having an initial pH of about 5.8 was treated by the addition, all at one time, of 25 milliliters of 5.25% sodium hypochlorite solution which did not cause much of a change in the pH level, the addition having been made at point Q10. However, the sodium hypochlorite solution was observed to attack the organic matter, lightening its color, although by no means getting rid of the black areas or disposing of the odor. After sufficient stirring of the hypochlorite solution in the sludge the pH stabilized at about 6. The batch was then further treated by the addition of 5 milliliters of 25% by volume sulfuric acid which lowered the pH to 4. Then two more 5 milliliter aliquots were added at spaced intervals, making a total of 15 milliliters of the 25% sulfuric acid introduced in equal aliquots. At each state, samples were withdrawn for metal analysis, producing results approximately as shown in FIG. 6. During the first acid addition at point Q11, it will be seen that the pH went down rapidly to about 4, but as the water was released from the cells it increased again and stabilized at about 5.4, indicating that the earlier infusion of hypochlorite had been insufficient to break down many of the cells, but had gone to work breaking the cells down more vigorously as soon as the acid was introduced. A second addition at point Q12 produced similar results, lowering the pH down to about 3.7 from which it returned to about 4.3 as more water was released from the cells. The third introduction of acid at point Q13 lowered the pH to about 3, but released a decreasing quantity of water which brought the pH up only to about 3.5. Thus, it will be seen that the acid was performing a helpful function, each aliquot causing the hypochlorite to release additional, though decreasing quantities of water from the cells. A comparison of the righthand portion of FIG. 9 beyond the point Q11 with the righthand portion of FIG. 8 beyond the point Q5 indicates the release of considerable water from the cells because the pH rises again after each infusion of acid as the cells break down, whereas in the righthand portion of FIG. 8 beyond the point Q5 each introduction of acid resulted in only a steady decrease in pH, not followed by an increase.

EXAMPLE 6

In this example, FIG. 10, 200 milliliters of sludge at approximately pH 5.8 were treated with 50 milliliters of 5.25% sodium hypochlorite solution in 10 milliliter aliquots as shown to the left in FIG. 10 as represented by the vertical peaks located the left of the peak Q20. At first, the sludge was very thick and difficult to stir, but by the time three aliquots of hypochlorite had been added the solution was much more mobile, i.e. stirrable, much lighter in color, and contained only a small amount of black area. Beginning at about pH 6.7, small increments of concentrated sulfuric acid were added, bringing the pH down. A total of 2.5 milliliters of concentrated sulfuric acid brought the pH finally down to 1, but it can be seen that the acid had much less effect than was observable in FIG. 9. For instance, the aliquot added at point Q21 brought the pH of the solution down from about 6.5 to about 5.8, but it went back only to about 6.1 from that point. This indicated some additional release of higher pH water from the sludge cells, but on subsequent additions such as at Q22 the pH merely went down, and scarcely came back after the initial moment of addition, meaning that the cells were no longer being broken down. It therefore appears that by the time 50 milliliters of sodium hypochlorite solution have been added the acid does much less than was the case in connection with the showing of FIG. 9 wherein the additional acid aliquots added in three steps each produced a very substantial subsequent rise in pH, showing that additional cells were being broken down.

EXAMPLE 7

In this example, FIG. 11, the 200 milliliter sludge specimen was treated with 100 milliliters of 5.25% sodium hypochlorite introduced all at once. Stirring the mixture resulted in the generation of gases and foaming action, but the pH rose only slightly from 6. After the pH had stabilized the batch was then treated with concentrated sulfuric acid to lower the pH in steps as aliquots of the solution were withdrawn to check the metal extraction, which approximated what is shown in the tables of FIGS. 4 and 6. Three milliliters of the concentrated acid beginning at point Q30 were sufficient to lower the pH to 1. FIG. 11 shows the variation of the pH with time. It is important to note that the acid appears to have done nothing but lower the pH of the mixture. At the time of each aliquot addition of the acid, the pH simply fell to a lower level, but did not rise just after each addition to an intermediate level, which responce would correspond with what is shown in FIG. 9 wherein each introduction of acid was liberating further water from the cells in cooperation with the hypochlorite solution. For this, it is concluded that in the experiment shown in FIG. 11, the acid performed virtually no useful purpose, since the hypochlorite solution had apparently adequately broken the cells down. It therefore appears that the 100 milliliters of sodium hypochlorite is excessive.

From a consideration of the above examples, certain facts are learned.

From a comparison of the showings in certain figures of the drawing, it can be clearly seen that the combination of sulfuric acid with hypochlorite makes the process far more affective because of the combination. For example, by observing FIG. 8 it can be seen that there were 15 separate additions of hypochlorite, 10 milliliters at a time without the addition of acid. FIG. 8 clearly shows that after 40 milliliters had been added, beginning at point Q6 the 50th milliliter was still producing a sizable release of water from the sludge. For the point Q6 to the point Q3 there were 10 more injections of 10 milliliters each, and they all produced substantial releases of water from the sludge, although by the point Q3 the release had declined considerably. By this time, however, it had taken 150 milliliters of 5.25% hypochlorite to break down 200 milliliters of sludge, and this is clearly an uneconomical process. When eventually the acid was inserted at point Q5 in on FIG. 8, the sludge was pretty well broken down and therefore the acid contributed little except the undesirable lowering of the pH. On the other hand, as shown in FIG. 9 the entire addition of hypochlorite was only 25 milliliters, as compared with 150 milliliters in FIG. 8. Moreover, in FIG. 8, 25 milliliters of hypochlorite had only begun to do the job of breaking the sludge down, whereas in FIG. 9 a total of 25 milliliters, when small quantities of acid were added, substantially broke the sludge down and released considerable water as is indicated to the right of Q11. At that, only 37 milliliters of 10% sulfuric acid were added in order to achieve satisfactory dewatering. Thus, 25 milliliters of hypochlorite plus 37 milliliters of sulfuric acid, FIG. 9, did substantially as well as 150 milliliters of hypochlorite, the acid having contributing little in FIG. 8.

The obverse case where an excessive quantity of acid was used together with a thoroughly inadequate quantity of hypochlorite is described in the article mentioned above and taken from the Journal of the Environmental Engineering Division entitled "Chlorine and Acid Conditioning of Sludge" wherein the author acknowledges that the acidity rather than the chlorination was largely responsible for the observed dewatering.

Moreover, the use of acid with the hypochlorite accomplishes the dewatering very much faster. Note how long it took the hypochlorite alone in FIG. 8 to dewater the sludge, and how quickly it was accomplished in FIG. 9 after acidification. The rapidity of the reaction in FIG. 9 is similar to the reaction times in FIGS. 3, 5 and 7, requiring only about three or four times divisions of five minutes each, and the quantity of acid required is small. In addition, it can be seen that in FIGS. 3, 5 and 7 the pH of the sample after hypochlorite treatment and gone back up toward 7 and had reached a point in FIG. 3 at point P4, in FIG. 5 at point P8, and in FIG. 7 at point P14 where the treatment could have been stopped and the bulk water drained off at such a high pH that virtually all of the metal values would have been precipitated out. Thus, by introducing the acid first, only a smaller amount of acid is required and the treatment ends up at about the correct pH level due to release from the cells of high pH water during the course of the treatment.

Conversely, by observing FIGS. 9 and 10 it will be seen that when the hypochlorite is introduced first, and the acid is introduced thereafter, more acid is required, 37 milliliters of 10% acid in FIG. 9 for example to achieve adequate release of water from the cells for purposes of dewatering. In addition, it should be noted that the treatment in FIGS. 9 and 10 takes place with a continuously dropping pH so that at the end of the treatment the pH is so low that excessive metal values are going into solution rather than being precipitated out of the bulk water which constitutes the filtrate. As a result, it would be necessary to introduce some alkaline material in order to raise the pH back up to the vicinity of 6 or 7 before the bulk water could be drained off substantially free of metal values. Otherwise it would take a large proportion of the metal values with it, and therefore be unsatisfactory for return to the aquifer.

Furthermore, in the absence of the sulfate ions introduced by the acid, the hypochlorite tends to form soluble metal values, which is ecologically undesirable. When the acid is introduced first, metal sulfates or hydroxyl complexes form and tend to precipitate and be removed from the bulk water assuming pH levels of 3 or more, as substantiated in an article entitled "The physical Chemistry of Iron Precipitation In the Zinc Industry", appearing in LEAD, ZINC, TIN '80, published by TMS-AIME, World Symposium on Metallurgy and Environmental Control (1980). In addition the sulfate ions combine with the calcium in the sludge and precipitate out as gypsum, which not only further purifies the bulk water, but also improves the filterability of the separated solids.

It is further apparent from the above examples that the present dewatering process is preferably a batch process, rather than a continuous process. Treating it as a batch process leads to much more economical operation because it has been observed that after acidification, if the hypochlorite is added in steps, for instance 25 milliliter steps, with each addition of hypochlorite there is a large release of water from the sludge. Each time the water is released, if it is drained away so that the total bulk water is greatly diminished, a much smaller quantity of hypochlorite is necessary to treat the remaining sludge in a subsequent step. Alternatively, the same quantity of chemicals introduced into the drained batch would produce greater dewatering since the total quantity of material in the batch has been considerably reduced. Moreover, as can be seen at points P2 and P3 of FIG. 3, and P6 and P7 of FIG. 5, and P12 and P13 of FIG. 7, at the time of introduction of the hypochlorite the pH rises upward so that the metal values will tend to precipitate out of the bulk water, thereby leaving ecologically acceptable water to be drained off and returned to the influent of the main sewage treatment system, its metal values being precipitated out due to the much higher pH of the influent with which it mixes. It is assumed that the quantity of supernatant which is returned to the treatment plant, as compared with the quantity entering the main influent, will be small.

From observation of the above examples, an indication of how much hypochlorite is needed can be determined, and this determination is further aided by visual observations made at the time of the series of experiments. Regarding how much hypochlorite to add, recalling that each experiment started with 200 milliliters of sludge having very little bulk water included therewith, in Example 5, FIG. 9, only 25 milliliters of 5.25% sodium hypochlorite were added. In FIGS. 3 and 5 after acidification aliquots of 25 milliliters were added three times. In each of these experiments, after a total of 25 milliliters had been added, the nature of the sludge underwent material changes. The gelantinous organic matter became quite mobile in the newly released bulk water and was much easier to stir. Moreover, the color had lightened and a large proportion of the black areas had disappeared, accompanied by a considerable reduction of odor. However, this initial injection of 25 milliliters is considered to be the minimal amount required to produce worthwhile results. FIG. 9 shows that where only 25 milliliters of hypochlorite was used that the addition of a greater quantity of acid was then required, namely 37 milliliters of 10% sulfuric acid to achieve adequate dewatering. Thus, 25 milliliters of hypochlorite appears to be a minimal treatment, although still operative. In example 6, FIG. 10, a total of 50 milliliters of hypochlorite was used, and after the subsequent addition of sulfuric acid, satisfactory results were obtained. In example 7, FIG. 11, a total of 100 milliliters of hypochlorite was used, and this appears to have been somewhat too much in view of the fact that the subsequent addition of acid did nothing except lower the pH of the sludge specimen which was apparently already well broken down in the sense that most of the water was released from the organic cells prior to the introduction of the acid. In examples 1 and 2, FIGS. 3 and 5, 75 milliliters of hypochlorite was used, and it will be observed that each hypochlorite addition was accompanied by a release of water as indicated by the return upwardly of the pH level due to such release of water, following for instance the points P2 and 3, and the points P6 and 7. Therefore, 75 milliliters of hypochlorite was not too much. From this, it would appear that for 200 milliliters of sludge, between 25 and 75 milliliters of 5.25% hypochlorite would establish a working range, with 50 milliliters probably being about optimum. Variations in the actual composition of the sludge will, of course, affect any particular selection. 25 to 75 milliliters of 5.25% hypochlorite in 200 milliliters of sludge can be recalculated in terms of 100% hypochlorite to be in the range of 0.656% to 1.97% by volume, which for convenience is rounded out to 0.6 to 2.0% by volume.

Considering now the quantity of sulfuric acid required, the first requirement is that the acid be added in sufficient quantity to lower the pH of the unoxidized sludge down to between 3 and 5. Where the acid is added first, as in Examples 1 and 2, 6.6 to 8 milliliters of 25% sulfuric acid was required. A greater quantity of acid would have lowered the pH so far as to excessively dissolve metal values in the bulk water which is highly undesirable, although undesirable dissolving might be later corrected by raising the pH so as to precipitate the metal values back out of solution. However, it is even more damaging when the pH is lowered too low, that organic complexes dissolve in the bulk water, and these complexes will not be later precipitated by elevating the pH level. In this regard, it is pointed out that the above mentioned German Pat. No. 2,648,788 establishes that a pH of 1.8 results in excessive dissolving of the organic compexes in the water at an elevated mixture temperature. All these factors considered, the addition of acids should not lower the pH below 3, and preferably closer to 4, it being noted that the results attained in the experiments 1 and 2 as shown in FIGS. 3 and 5 are substantially equivalent from the point of view of dewatering the sludge, and that the tables in FIGS. 4 and 6 show, when their last lines are compared, that only a very small amount of metal values remained dissolved in the bulk water. This indicates that lowering pH from 4 to 3 apparently achieves nothing additional, nor did it lose any significant quantity of metal values. It is therefore concluded that a quantity of acid should be added in the vicinity of about 8 milliliters of 25% by volume sulfuric acid per 200 milliliters of this type of organic sludge, which can be recalculated in terms of 100% sulfuric acid to be 2 milliliters, or about 1.0% by volume. Conversely, Example 3, FIG. 7, shows that when the ph is lowered only to about 5 initially, 75 milliliters of hypochlorite was not adequate to definitely separate the supernatant from the solids, and that discoloration and odor persisted. Addition of another 50 milliliters of hypochlorite achieved better results, but still not as complete dewatering, and at the expense of an uneconomic use of hypochlorite. From this it is concluded that pH 5 is about at the upper limit and that lowering the pH to about 4 provides about optimum results for this type of organic sludge.

The following claims set forth the process according to the present invention.

We claim:

1. A process for dewatering an activated-bacteria organic sludge initially containing in its organic cellular structure 70 to 90% water by weight and containing metal values and calcium, by rupturing the cellular structure to release water therefrom with minimal degradation of the organic structure and minimal loss of fuel value while retaining most of the metal values entrained in the dewatered sludge, the process consisting of:
   (a) isolating the sludge into a batch whose volume is known;
   (b) adding acidifying and oxidizing reagents to the batch so that they are simultaneously present therein, and mixing the reagents with the batch;
   (c) the acidifying reagent comprising mineral acids added in such quantity as would in the absence of the oxidizing reagent adjust the pH of the batch into a range between 3 and 5;
   (d) the oxidizing reagent being added to the batch in such quantity as would in the presence of the acidifying reagent within half an hour result in sufficient release of water from the cellular structure to increase by at least one the adjusted pH; and
   (e) separating the supernatant water released out of the cellular structure from the remaining organic matter and solid matter including most of said metal values.

2. The dewatering process as claimed in claim 1, wherein following step (e), the steps (b) and (c) and (d) and (e) are repeated treating the separated organic matter and solid matter as a new batch.

3. The dewatering process as claimed in claim 1, wherein the batch of sludge is taken from a sewage treatment plant, and wherein the separated supernatant water is returned to the sewage treatment plant as influent.

4. The dewatering process as claimed in claim 1, wherein said mineral acid comprises sulfuric acid.

5. The dewatering process as claimed in claim 4, wherein the quantity of acid to acidify a sludge having an initial pH of about 6 should be the equivalent in concentrated sulfuric acid of about 1% by volume of the volume of said sludge batch.

6. The dewatering process as claimed in claim 1, wherein the organic and solid matter separated in step (e) is dried to form a cake capable of autogenous combustion.

7. The dewatering process as claimed in claim 1, wherein the oxidizing reagents added are selected from a group including sodium hypochlorite, calcium hypochlorite, potassium nitrate, sodium nitrate, hydrogen peroxide and chlorine gas, acid solutions of chromates, acid solutions of permanganates, and oxalic acid.

8. The dewatering process as claimed in claim 1, wherein the quantity of oxidizing reagent added when expressed in terms of a concentrated reagent is in the range of 0.6 to 2.0% by volume of the volume of the sludge batch.

9. The dewatering process as claimed in claim 1, wherein the mineral acid and the reagents are added in nonconcentrated solutions to increase the mobility of the sludge.

10. A process for dewatering an activated-bacteria organic sludge having initially occluded in its organic cellular structure 70 to 90% water by weight and containing metal values and calcium, by rupturing the cellular structure to release water therefrom with minimal degradation of the organic structure and minimal loss of fuel value while retaining most of the metal values entrained in the dewatered sludge, the process consisting of:
   (a) isolating a batch of sludge by separating it from bulk water;
   (b) adding to the batch acidifying and oxidizing reagents so that they are simultaneously present therein, and mixing the reagents with the batch;
   (c) the acidifying reagent comprising mineral acids added in such quantity as would in the absence of the oxidizing reagent adjust the pH of the batch into a range between 3 and 5;
   (d) the oxidizing reagent being added to the batch in such quantity as would in the presence of the acidifying reagent cause within one-half hour separation of the batch into a clear supernatant liquid including about 70–90% of the said occluded water over the remaining organic and solid matter, with a clear line of demarcation therebetween; and
   (e) separating the supernatant liquid from the organic and solid matter.

11. The dewatering process as claimed in claim 10, wherein following step (e), the steps (b) and (c) and (d) and (e) are repeated treating the separated organic matter and solid matter as a new batch.

12. The dewatering process as claimed in claim 10, wherein the batch of sludge is taken from a sewage treatment plant, and wherein the separated supernatant water is returned to the sewage treatment plant as influent.

13. The process as claimed in claim 10, wherein oxidizing reagent is added in such quantity as will eliminate dark areas in the sludge and turn it to a light tan color.

14. The process as claimed in claim 10, wherein the oxidizing reagent is added in such quantity as will substantially deodorize the sludge and kill pathogens therein.

15. The process as claimed in claim 10, wherein the oxidizing reagent is added in such quantity that within half an hour the batch will release sufficient water from the cellular structure to stabilize at a pH higher than 5.

16. The dewatering process as claimed in claim 10, wherein said mineral acid comprises sulfuric acid.

17. The dewatering process as claimed in claim 10, wherein the organic and solid matter separated in step (e) is dried to form a cake capable of autogenous combustion.

18. The dewatering process as claimed in claim 10, wherein the oxidizing reagents added are selected from a group including sodium hypochlorite, calcium hypochlorite, potassium nitrate, sodium nitrate, hydrogen peroxide and chlorine gas, acid solutions of chromates, acid solutions of permanganates, and oxalic acid.

19. The dewatering process as claimed in claim 10, wherein the mineral acid and the reagents are added in nonconcentrated solutions to increase the mobility of the sludge.

* * * * *